United States Patent
Demaray et al.

(10) Patent No.: US 6,170,082 B1
(45) Date of Patent: *Jan. 2, 2001

(54) TAKING CORRECTIVE ACTION IN COMPUTER PROGRAMS DURING INSTRUCTION PROCESSING

(75) Inventors: Milton Wayne Demaray, Fremont; William Gary Cox, Mountain View, both of CA (US)

(73) Assignee: Hitachi Data Systems Corporation, Santa Clara, CA (US)

( * ) Notice: Under 35 U.S.C. 154(b), the term of this patent shall be extended for 0 days.

This patent is subject to a terminal disclaimer.

(21) Appl. No.: 09/059,536

(22) Filed: Apr. 13, 1998

Related U.S. Application Data (63) Continuation of application No. 08/704,225, filed on Aug. 27, 1996, now Pat. No. 5,740,442.

(51) Int. Cl.⁷ ........................................................ G06F 9/45
(52) U.S. Cl. .................................................. 717/4; 714/38
(58) Field of Search .................................... 395/701, 702, 395/703, 704, 705; 714/35, 38; 712/226, 227, 244, 242, 243; 707/1, 100, 102, 104; 717/1–5

(56) References Cited

U.S. PATENT DOCUMENTS

| | | |
|---|---|---|
| 4,193,255 | 3/1980 | Ebihara et al. . |
| 4,540,292 | 9/1985 | Rubenstein et al. . |
| 4,573,127 | 2/1986 | Korff . |
| 4,696,003 | 9/1987 | Kerr et al. . |

(List continued on next page.)

FOREIGN PATENT DOCUMENTS

| | | |
|---|---|---|
| 182235 | 4/1990 | (JP) . |
| 9738379 | 10/1979 | (WO) . |

OTHER PUBLICATIONS

S. McCarthy, "2001: A Calculation Quandary," *Government Computer News,* Aug. 1995, vol. 14, No, 17, p. 59.

J. Celko, E.L. Appleton and D. Baum, three articles, *Datamation,* Jan. 1996, vol. 42, No. 1, pp. 36–38, 42–44, 49, 50 and 53.

J. Hart, et al., "A Scaleable, Automated Process for Year 2000 System Correction," Jan. 1996, Proc. of ICSE–18, pp. 475–484.

D. Bartholomew and C.L. Meador, two articles, *Information Week,* Feb. 1996, pp. 30–32, 36, 40, 44, 45, 48, 50 and 51.

F. Olsen, "Xpediter Helps Programmers Find and Edit Date Codes," Jun. 1996, Government Computer News, Cahners Publishing Associates LP.

D. Henry, "Any Future in 'Year 2000' Stocks?" USA Today, Oct. 10, 1996, p. 3B.

R. Chandrasekaran, "A Date With Disaster on Jan. 1, 2000?" Washington Post, Oct. 25, 1996.

*Primary Examiner*—Kakali Chaki
(74) *Attorney, Agent, or Firm*—Gallagher & Lathrop; David N. Lathrop (57) ABSTRACT

A standardized test environment assists identifying problematic instances of instructions in computer programs that produce erroneous results. A standardized production environment takes corrective action for selected instructions by intercepting instruction processing during instruction fetch, instruction decode or instruction execution and modifying one or more values such that the instructions achieve correct results. In one embodiment of a test environment, a computer system collects diagnostic information for designated instructions such as subtraction operations that produce negative results. In one embodiment of a production environment, a computer system intercepts instruction processing for instructions at specified locations in a program and takes corrective action according to information obtained from a table of control information.

20 Claims, 5 Drawing Sheets

U.S. PATENT DOCUMENTS

| | | |
|---|---|---|
| 5,222,052 | 6/1993 | Salame . |
| 5,438,574 | 8/1995 | Taniguchi . |
| 5,446,851 | 8/1995 | Yamaguchi . |
| 5,511,164 | 4/1996 | Brunmeier et al. . |
| 5,526,515 | 6/1996 | Ross et al. . |
| 5,600,836 | 2/1997 | Alter . |
| 5,630,118 | * 5/1997 | Shaughnessy .............................. 707/1 |
| 5,644,762 | * 7/1997 | Soeder ...................................... 707/6 |
| 5,761,668 | * 6/1998 | Adamchick ........................... 707/101 |
| 5,987,600 | * 11/1999 | Papworth et al. .................... 712/244 |
| 6,012,141 | * 1/2000 | Isaman ................................. 712/244 |

* cited by examiner

TAKING CORRECTIVE ACTION IN COMPUTER PROGRAMS DURING INSTRUCTION PROCESSING

CROSS-REFERENCE TO RELATED APPLICATION

This application is a continuation of U.S. patent application Ser. No. 08/704,225 that was filed Aug. 27, 1996, now U.S. Pat. No. 5,740,442.

TECHNICAL FIELD

The present invention relates generally to data processing and information management systems. In particular, the present invention relates to a standardized way to detect errors and a way to correct errors during the execution of a computer program by intercepting the execution of the computer program during instruction fetch, decode or execution and modifying one or more values to take corrective action. The present invention is useful for detecting and correcting errors such as those obtained from calculations performed by systems using dates that express the year in a truncated form.

BACKGROUND ART

Many computer programs in use today process values representing dates in which years are expressed in a truncated form of only two decimal digits. The truncated form has been widely adopted because it reduces the amount of space needed to store date information.

Although such a truncated form can express a range of only 100 years, this limitation has not yet caused widespread problems because the dates processed by most computer programs have been confined to this century. During the next four years, however, essentially every organization using data processing or information management systems will be affected by the so called "year 2000 problem" because these systems must process dates for years in the 1900s as well as in the year 2000 and beyond.

Solving the year 2000 problem has two aspects. The first aspect is identifying problematic instances in programs and data caused by dates in which years are expressed in a truncated form. The second aspect is fixing the problematic instances after they have been identified. Neither aspect lends itself to a standardized approach because there is no standard way to store a date. For example, one way in which a date may be stored requires six digits in which two digits are used to express the month, two digits are used to express the day within the month, and two digits are used to express the last two digits of the year; however, many variations exist for even this one way because the order of the digits representing month, day and year may be arranged in any order. Further, a variety of representations such as "packed decimal," "binary" and "binary coded decimal" (BCD) may be used.

One scheme that has been offered to avoid the year 2000 problem expresses dates as 32-bit signed binary numbers representing the number of seconds since a base time such as midnight preceding Jan. 1, 1970. Unfortunately, for the specific example mentioned, the binary number reaches its maximum value in 2038. In other words, such a scheme does not avoid the problem but merely postpones it. In any case, using alternative ways to represent dates does not provide any help for finding and correcting errors in existing programs that use other formats to represent dates.

Without a standardized way to identify and correct problematic instances, organizations are forced to have programmers review programs to develop corrective measures. Throughout this discussion, the term "programmer" is intended to refer to any individual responsible for reviewing various computer programs and for developing corrective action. Such a review is not only prone to error and oversight but it is also expensive. Some estimates of the costs required by major organizations to correct their systems are staggering, exceeding $100 million. The breadth and depth of the problem is so great that even ardent competitors are participating in collaborative efforts to better understand the nature of the problem and to develop better tools to deal with it.

SUMMARY OF INVENTION

It is an object of the present invention to provide a standardized way to assist identifying problematic instances in programs It is another object of the present invention to provide a way to take corrective action during execution of programs.

In accordance with one aspect of the present invention, a method performs a test-mode execution of a computer program in which diagnostic information pertaining to designated instructions is obtained and a report of the diagnostic information is generated; receives input prepared in response to the report, the input identifying one or more selected instances of operations within the computer program producing an erroneous result; and performs a production-mode execution of the computer program during which processing of instruction fetch, instruction decode or instruction execution for selected instructions is intercepted and one or more values are modified so as to take corrective action.

In accordance with another aspect of the present invention, a method for taking corrective action during execution of a computer program receives input, constructs control information in response to the input, and executes the computer program during which processing of instruction fetch, instruction decode or instruction execution is intercepted for selected instructions and corrective action is taken according to the control information The present invention may be practiced in a variety of ways. For example, the present invention may be performed as a method or process, implemented by a computer system or other type of machine, tangibly embodied as a program of instructions on a machine readable storage medium, and embodied in transmissive media such as electric, electromagnetic or optical signals.

Alternative embodiments are set forth throughout this description and in the drawings in which like features are referred to using like reference numbers.

EMBODIMENTS FOR CARRYING OUT THE INVENTION

Figure 2:
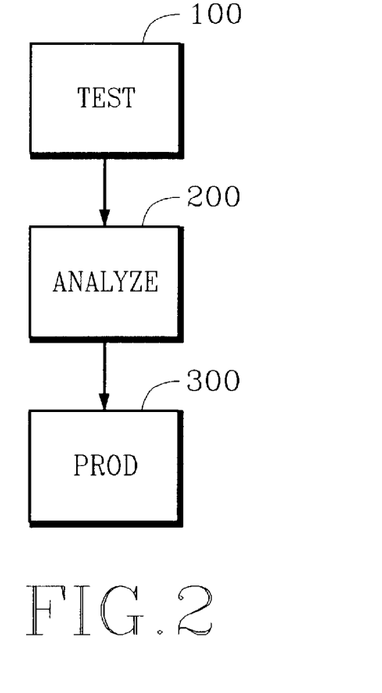
FIGS. 2–5 are flow diagrams illustrating a flow of activities for various methods according to the present invention.

FIG. 2 illustrates three phases in one process for practicing the teachings of the present invention. The first phase, test 100, provides a standardized way to assist identifying problematic instances in programs and data caused by dates in which years are expressed in a truncated form. The second phase, select 200, receives input selecting specific instances and specifying corrective action to be taken and constructs control information for use in a third phase. The third phase, prod 300, provides a standardized way to take corrective action using the control information constructed in the second phase.

Figure 1:
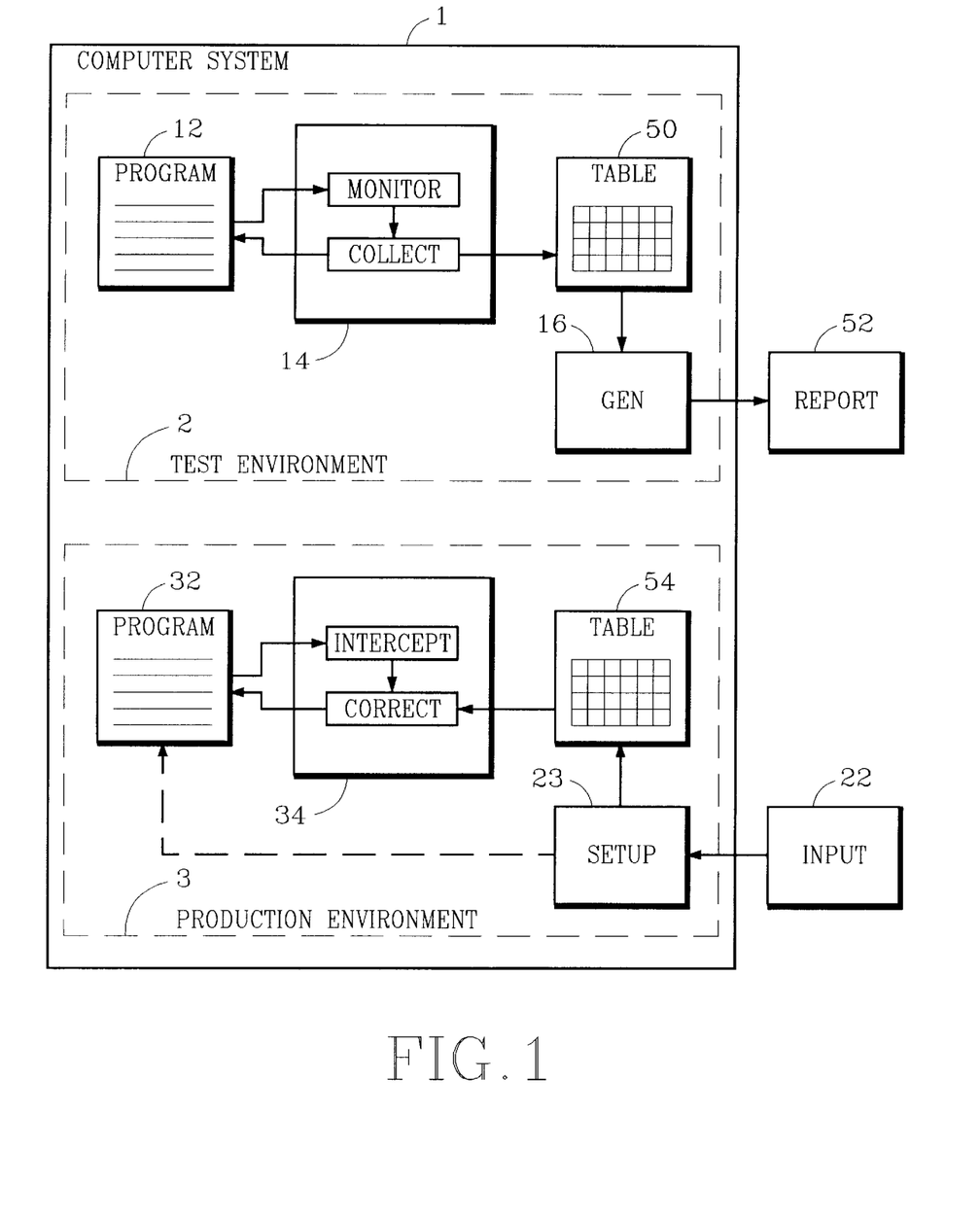
FIG. 1 is a functional block diagram of a hypothetical computer system including a test environment for finding potential problematic instances and a production environment for automatically taking corrective action.

FIG. 1 illustrates a hypothetical computer system 1 providing test environment 2 in which the phase represented by test 100 may be carried out and production environment 3 in which the phases represented by select 200 and prod 300 may be carried out.

Test environment 2 permits a computer time-of-day (TOD) clock to be set to any date and time desired while executing computer program 12. Facility 14 within the environment monitors the execution of computer program 12 and, when the result of a subtraction operation in the program is negative, collects diagnostic information about the subtraction operation that is stored into table 50. Report generator 16 generates report 52 from the diagnostic information stored in table 50.

Report 52 provides diagnostic information that can be used by a programmer to identify specific instances of operations within computer program 12 that produce erroneous results. With the assistance of report 52, a programmer can develop corrective action for the specific instances and prepare input 22 in response thereto.

Setup 23 within production environment 3 constructs table 54 and optionally modifies computer program 32 in response to input 22. Facility 34 intercepts the execution of computer program 32 at locations specified by input 22 and takes corrective action according to control information stored in table 54.

In one embodiment, computer system 1 is implemented by one mainframe computer and the two environments are implemented by virtual machines. In another embodiment, the two environments are implemented by separate computer systems. The present invention may be practiced on a variety of hardware platforms including mainframe computers, minicomputers and micro-processor based systems, and on a variety of software platforms including virtual machines, multi- and single-tasking operating systems. Although more particular mention is made herein of mainframe type hardware and software systems, the hardware and software architecture used to implement test environment 2 and production environment 3 is not critical to the practice of the present invention.

Examples of processes that may be used to carry out each of the three phases illustrated in FIG. 2 are discussed below. These processes do not represent the only way in which the phases may be carried out but are offered as examples to help explain basic concepts. Various alternatives and variations to these processes are discussed throughout this disclosure.

Test

Figure 3:
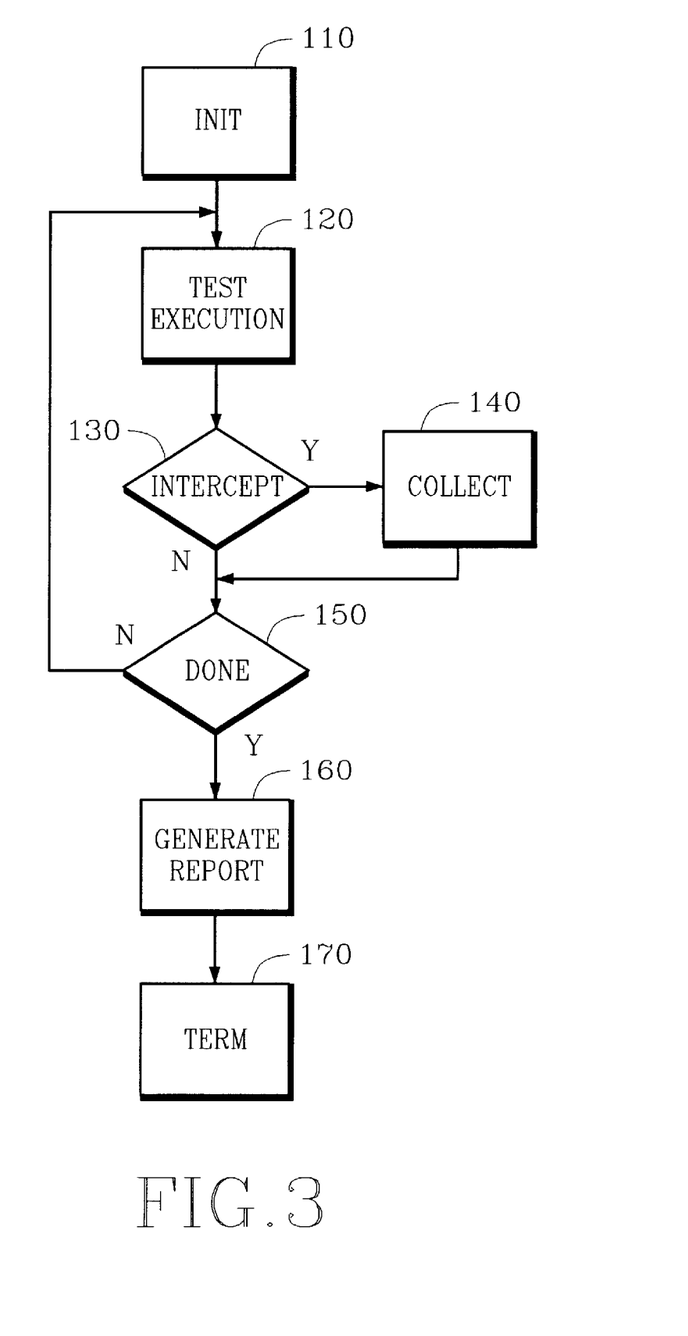

FIG. 3 represents one way in which the first phase, test 100, may be carried out. Init 110 performs initialization steps such as establishing test environment 2, setting a computer TOD clock to the desired time and date, and any other steps required to initiate execution of computer program 12. Test execution 120 executes instructions in computer program 12 and monitor 130 monitors the execution of subtraction operations. Whenever a particular instance of a subtraction operation produces a negative difference, monitor 130 passes control to collect 140 that collects diagnostic information about the specific instance and stores that diagnostic information in a structure such as table 50. Alternatively, test monitor 130 monitors all instructions and collect 140 collects diagnostic information for certain instructions under selected conditions such as subtraction operations with negative differences or all instructions that access the system TOD clock. Done 150 continues execution of computer program 12 until the program is completed. At the completion of the program, generate report 160 performs functions such as those performed by report gen 16 to generate a report like report 52 from diagnostic information such as that stored in table 50. Term 170 performs steps to terminate the first phase.

In one embodiment, text execution 120 includes the functions of instruction fetch, decode and execution. In this embodiment, monitor 130 monitors the results of the operation after execution has completed; however, information from instruction fetch and/or decode is also available to collect 140 that can be included in the diagnostic information. Many alternatives to this process are possible and a few are mentioned here. Program execution may be monitored at any point including during instruction fetch and decode. Diagnostic information may be collected for other types of operations such as those that retrieve time and date information from the system TOD clock. A report may be generated at the time diagnostic information is obtained by collect 140. Test execution and report generation may be performed for multiple programs.

Select

Figure 4:
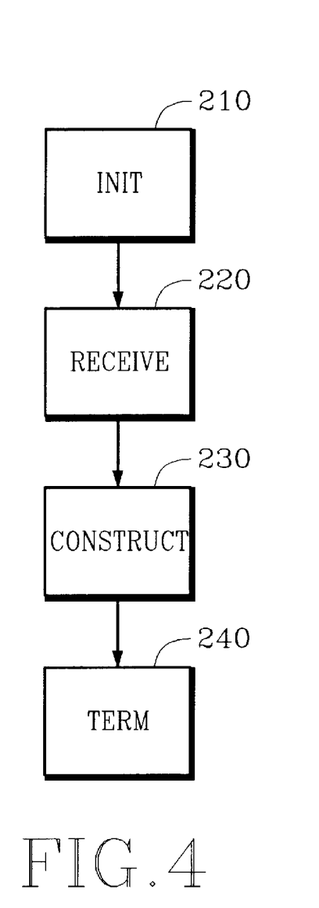

FIG. 4 represents one way in which the second phase, select 200, may be carried out. Init 210 performs initialization steps such as opening files, allocating memory, and setting initial values for parameters. Receive 220 accepts input information such as input 22 that specifies instances of operations in a computer program 32 requiring corrective action and that specifies the corrective action desired. In response to the input, construct 230 performs functions such as those performed by setup 23 to build a structure of control information such as table 54 used in the third phase to specify the desired corrective action. Term 240 performs steps to terminate the second phase such as closing files, and deallocating memory.

In some embodiments such as that shown for setup 23 in FIG. 1, the functions performed by construct 230 may also include modifying computer program 32 in response to the input. The modification may take the form of a "zap" that alters selected bytes of an executable program, a load module, or an object program. In particular, the operation code of selected instructions such as selected instances of subtract operations may be replaced by a designated code that causes a computer system to invoke special facilities used to take corrective action.

Production

Figure 5:
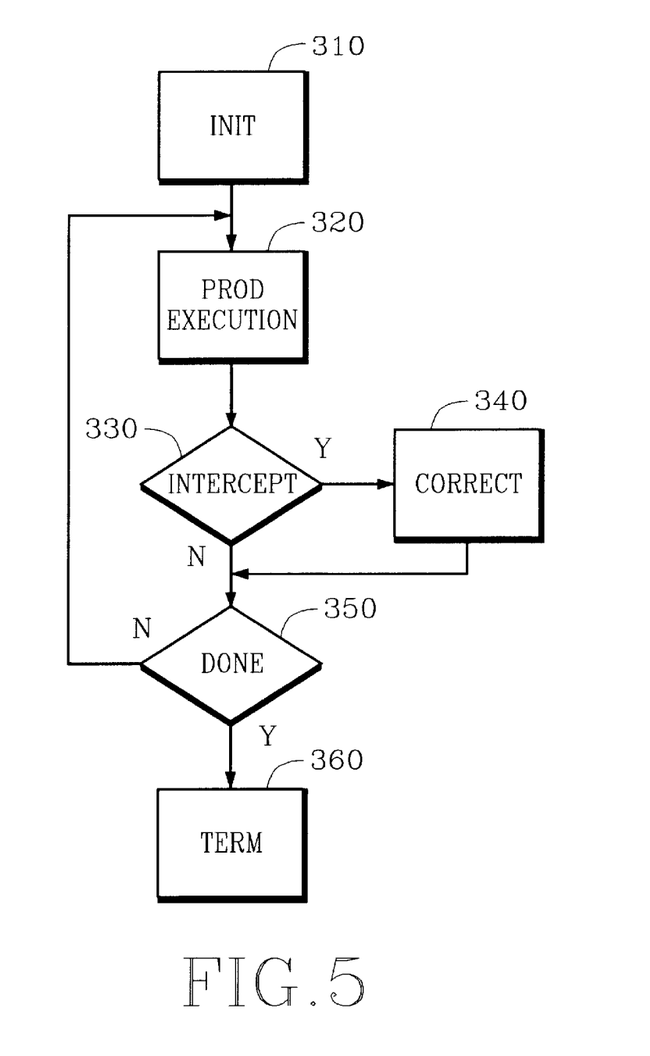

FIG. 5 represents one way in which the third phase, prod 300, may be carried out. Init 310 performs initialization steps such as establishing production environment 3 and any other steps required to initiate execution of computer program 32. Prod execution 320 executes computer program 32 and intercept 330 intercepts the execution of instructions that correspond to an entry in a structure of control information such as table 54. Intercept 330 passes control to correct 340 that takes corrective action according to the corresponding entry. Done 350 continues execution of computer program 32 until the program has completed. At the completion of the program, term 360 performs steps to terminate the third phase.

In one embodiment, prod execution 320 includes the functions of instruction fetch, decode and execution. In this embodiment, intercept 330 intercepts the process at a point after instruction execution has completed; therefore, correct 340 takes corrective action on the results of the instruction. In yet another embodiment, prod execution 320 includes instruction fetch and decode but not instruction execution. Instruction execution is performed elsewhere by a function not illustrated in FIG. 5. In this second embodiment, correct 340 takes corrective action on operands prior to instruction execution. Many other alternatives and variations are possible and a few more are mentioned here. Program execution may be intercepted and corrective action taken at any point including during instruction fetch, decode and execution. Program execution may be intercepted for all occurrences of one or more designated operation codes and corrective action taken only for those occurrences that have a corresponding entry in the structure of control information. Production execution and corrective action may be performed for multiple programs.

Implementation of Test Environment

Figure 6:
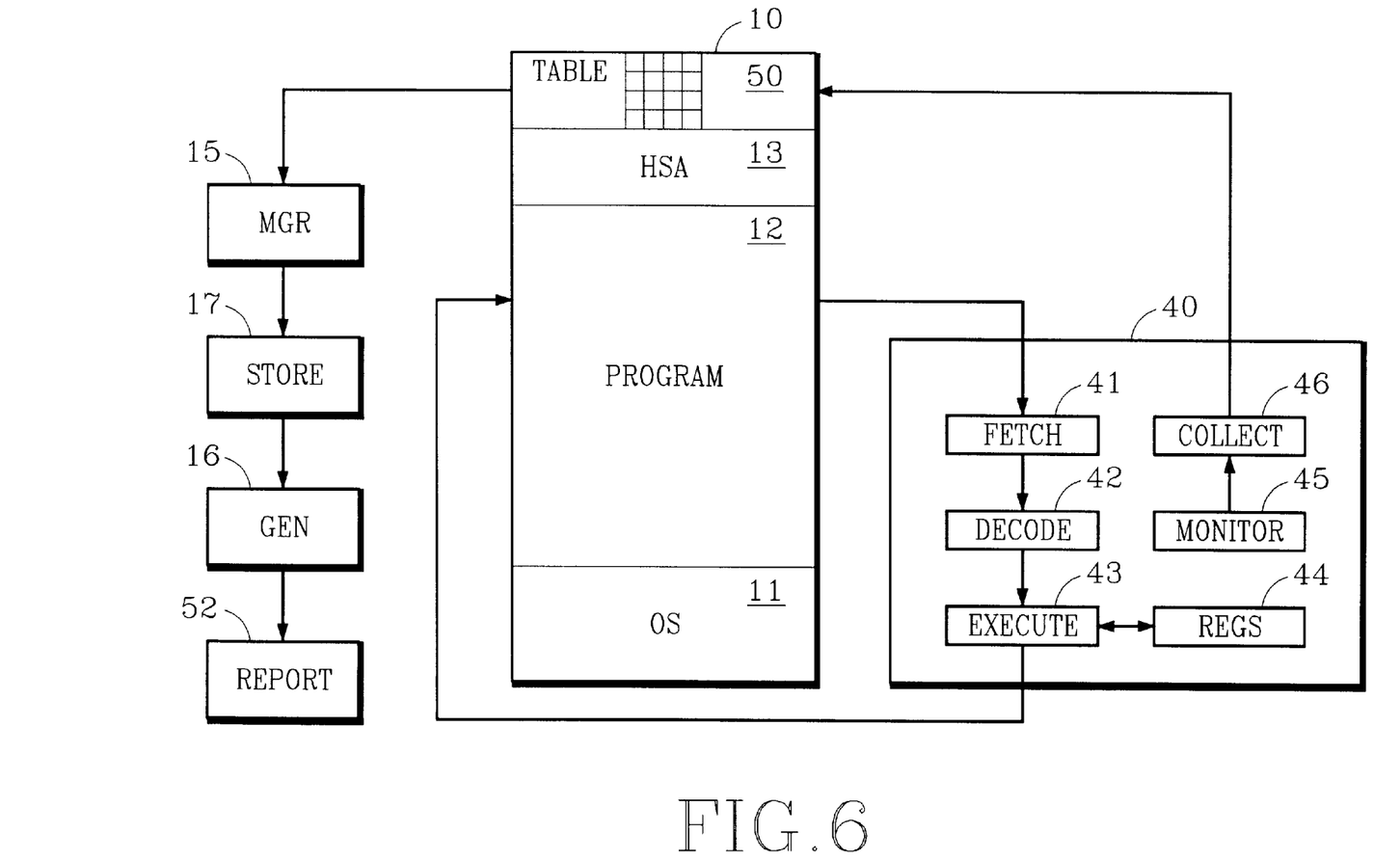
FIGS. 6–7 are schematic diagrams of hypothetical computer systems implementing various aspects of the present invention.

FIG. 6 is a schematic diagram of a system implementing test environment 2 in which random access memory (RAM) 10 comprises regions for operating system 11, application program 12, high storage area 13 for operating system use, and table 50 for diagnostic information. Processor 40 comprises instruction fetch 41 for fetching instruction text from RAM 10, decode 42 for parsing and decoding the instruction into a form that can be processed, and execute 43 for carrying out operations with registers 44 and locations in RAM 10 according to the instruction type. Various components and functions such as instruction address counters and status registers, or instruction pre-fetch and pipeline management used in some architectures, are not shown. The various components that are shown in this and the other figures are arranged for illustrative clarity and do not necessarily represent an actual arrangement of the components in a practical system. Monitor 45 monitors any or all of fetch 41, decode 42, execute 43 and registers 44 and causes collect 46 to collect diagnostic information for designated instructions such as subtraction instructions that result in a negative difference. Diagnostic information can be collected for other instructions such as those that access the system TOD clock.

For a computer system in which various functions in processor 40 are implemented by microcode, monitor 45 and collect 46 can be implemented by a combination of microcode and macrocode routines. Typically, the microcode routines reside in storage not illustrated that is accessible to internal components of processor 40 but are not accessible to external components such as operating system 11 or application program 12. Preferably, the macrocode routines are stored in RAM 10 in a reserved area such as the region where table 50 is stored. Preferably, the region in RAM 10 for table 50 is reserved at the time of initial microcode load (IML), thereby making it inaccessible to operating system 11. In such implementations, the diagnostic features of the test environment can be hidden from operating system 11 and application program 12. Alternatively, one or more features can be implemented by components in operating system 11 and diagnostic information and routines can be stored in a region of memory such as high storage area 13 that is accessible to operating system 11 but is not accessible to application program 12.

In a preferred embodiment, the diagnostic information collected by collect 46 includes the name or other identification of application program 12, the address or relative offset of the instance of the instruction within program 12 for which diagnostic information is being collected, the type of instruction such as a subtract or a read TOD clock instruction, the instruction text or other information identifying any operands, the value of any operands, the value of the result achieved by the instruction, an identification of the "job" or specific condition in which program 12 is executed, and a count of the number of times diagnostic information is collected for this particular instruction instance.

The diagnostic information may be adapted to suit the needs of a particular computer system, operating system and application program. For computer systems compatible with IBM® System/370® systems, for example, the instruction types could include subtract (S), subtract halfword (SH), subtract register (SR), subtract packed (SP) and store clock (STCK). For smaller computer systems incorporating a microprocessor compatible with the Intel 8086/8088 processor, for example, instructions could include decimal adjust for subtraction (DAS), subtract with borrow (SBB) and subtract (SUB); interrupt (INT) instructions unique to a particular operating system for reading the TOD clock could also be included. For application programs written in languages such as FORTRAN, COBOL, C, FOCUS or RAMIS, for example, cross-reference information relating the instruction instance to a source code statement would be desirable, if available, because it would simplify the task required to identify problematic instances of instructions in such programs. Alternatively, such cross-reference information could be provided later at the time diagnostic report 52 is generated.

Mgr 15 records the diagnostic information stored in table 50 on store 17 that is a storage medium such as random-access disk or tape. In effect, table 50 acts as an output or write buffer and mgr 15 is invoked to store the diagnostic information on store 17 before the information in table 50 is overwritten by later occurrences.

If table 50 is stored in a region of RAM 10 that is not accessible to operating system 11, mgr 15 may be controlled by collect 46 or by operator command not shown in the figure. Store 17 may be the same storage medium used to carry out the IML.

If table 50 is stored in a region of RAM 10 that is accessible to operating system 11, mgr 15 may be implemented by routines within operating system 11 and may be controlled by components responsible for job control, program or load module control, input/output control, or by operator command. Store 17 may be any storage medium.

Gen 16 generates report 52 from the diagnostic information recorded on store 17. Preferably, report 52 is automatically routed to an output device that is used to reproduce output generated by application program 12, thereby collating the diagnostic report with application program output. Cross-reference information to source code statements could be generated and reported at this time.

Implementation of Production Environment

Figure 7:
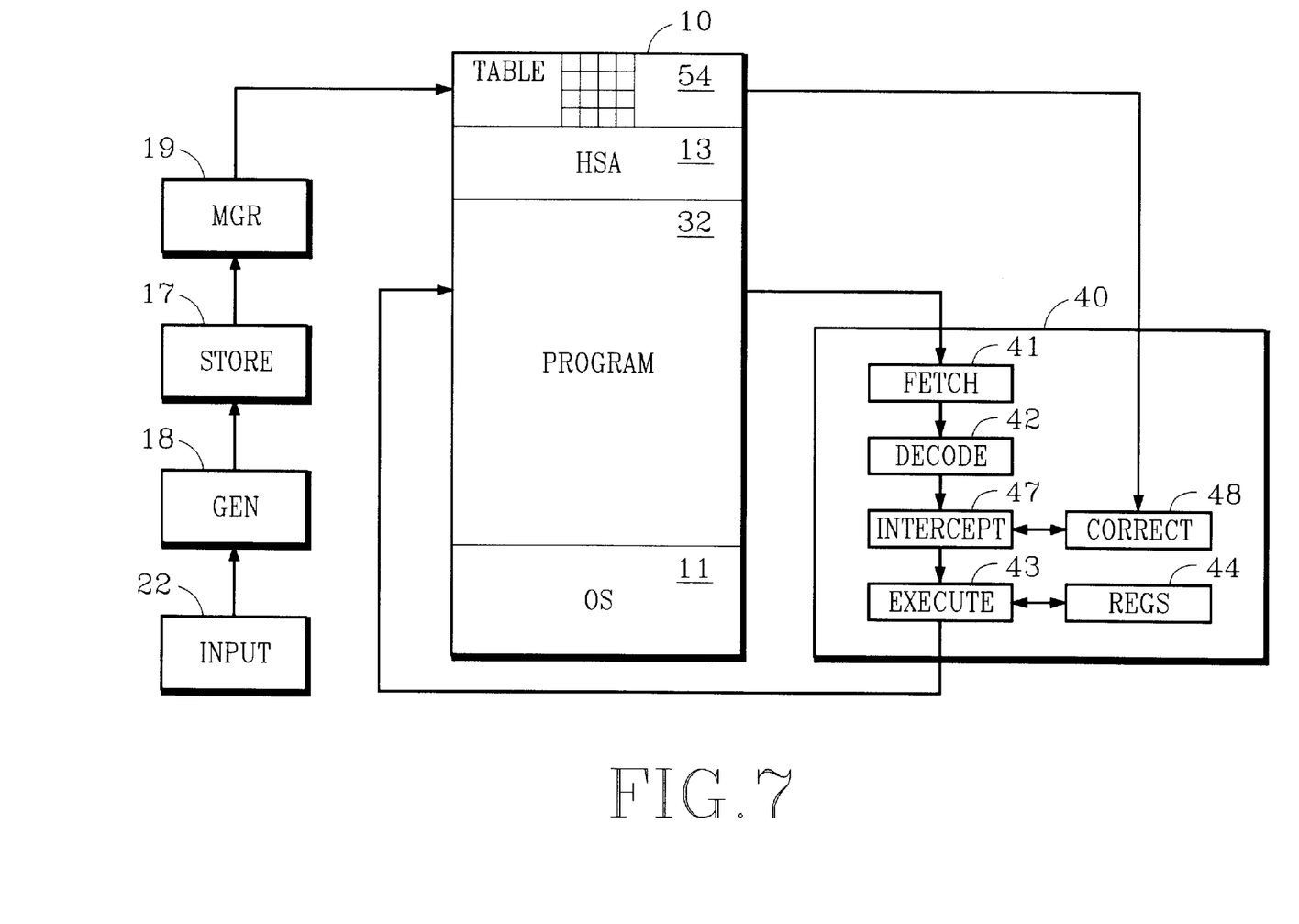

FIG. 7 is a schematic diagram of a system implementing production environment 3 in which RAM 10 comprises regions for operating system 11, application program 32, high storage area 13 for operating system use, and table 54 for control information. Processor 40 comprises instruction fetch 41, instruction decode 42, instruction execute 43 and registers 44 as discussed above. Intercept 47 determines if execution of the current instruction should be intercepted and, if so, passes control to correct 48 that carries out corrective action specified by the control information stored in table 54. In the embodiment shown, correct 48 may take corrective action by modifying one or more operands of the pending instruction because intercept 47 operates after instruction decode and before instruction execution. In an alternative embodiment not shown, intercept 47 operates after execute 43 and correct 48 takes corrective action by modifying the results achieved by execute 43. In yet other embodiments, intercept 47 may operate at various points along the instruction processing path.

For a computer system in which various functions in processor 40 are implemented by microcode, intercept 47 and correct 48 can be implemented by a combination of microcode and macrocode routines. Typically, the microcode routines reside in storage not illustrated that is accessible to internal components of processor 40 but are not accessible to external components such as operating system 11 or application program 32. Preferably, the macrocode routines are stored in RAM 10 in a reserved area such as the region where table 54 is stored. Preferably, the region in RAM 10 for table 54 is reserved at the time of IML, thereby making it inaccessible to operating system 11. In such implementations, the corrective features of the production environment can be hidden from operating system 11 and application program 32. Alternatively, one or more features can be implemented by components in operating system 11 and corrective routines can be stored in a region of memory such as high storage area 13 that is accessible to operating system 11 but is not accessible to application program 32.

Gen 18 generates control information in response to input 22 and records the control information on store 17 that can be a storage medium such as random-access disk or tape. Input 22 defines specific instances of instructions in application program 32 that require corrective action and further defines what corrective action is to be taken.

Mgr 19 loads control information into table 54 from the control information recorded on store 17. If sufficient memory is available so that the control information for all jobs and programs for which corrective action is to be taken can be loaded into table 54 at one time, mgr 19 could load the control information at IML or at Initial Program Load (PL) when operating system 11 is started. Alternatively, control information can be loaded into table 54 as needed.

If table 54 is stored in a region of RAM 10 that is not accessible to operating system 11, mgr 19 may be invoked during IML, may be indirectly controlled by operating system 11 using microcode and macrocode routines invoked by a designated instruction type to load tables at job initiation for example, or may be directly controlled by operator command. Store 17 may be the same storage medium used to carry out the IML. If table 54 is stored in a region of RAM 10 that is accessible to operating system 11, mgr 19 may be implemented by routines within operating system 11 and may be controlled by components responsible for job control, program or load module control, input/output control, or by operator command. Store 17 may be any storage medium.

In one embodiment, the control information loaded into table 54 includes the name or other identification of application program 32, the address or relative offset of the instance of the instruction within program 32 for which corrective action is to be taken, and the type of instruction. The corrective action adds a value of 100 in an appropriate form to the minuend of a subtraction instruction.

In another embodiment, the control information in table 54 also includes a definition of the corrective action to be taken. Table I provides a hypothetical example of such an embodiment for a IBM System/370 type computer system. The format of the information shown in the table is not intended to represent what would actually be stored in a practical embodiment of table 54 but is intended only to illustrate the type of information that could be stored. The information in the first column identifies the name of the application program or load module. The information in the second column identifies a relative offset within the program or load module for a specific instance of an instruction for which corrective action is to be taken prior to performing the instruction. Information in the third column identifies the instruction type of the specified instance, and the information in the remaining columns defines the corrective action to be taken.

TABLE I

| Program Name | Relative Offset | Type of Instruction | Corrective Action | Corrected Parameter | Corrective Value |
| --- | --- | --- | --- | --- | --- |
| PAYROLL | X'0E5C | SR | AR | R7 | D'1000000 |
| PAYROLL | X'10A8 | SP | AP | X'0808(R10) | X'100C |
| PAYROLL | X'133E | AH | OR | X'3AC0 | D'1900 |

The information in the first row of Table I indicates that corrective action is to be taken for a subtract-register (SR) instruction in a program named "PAYROLL" at a location 3,676 (X'0E5C) bytes from the start of the program. The corrective action is to add the decimal value "1000000" to register R7. Presumably, register R7 is the minuend of the SR instruction.

The information in the second row of Table I indicates that corrective action is to be taken for a subtract-packed (SP) instruction in the "PAYROLL" program at a relative offset of 4,264 (X'10A8) bytes by adding the packed-decimal value of "100" to the value stored in memory at a location 2,056 (X'0808) bytes beyond the address loaded in register R10. Presumably, the value stored in memory is the minuend of the SP instruction.

The information in the third row of Table I indicates that corrective action is to be taken for an add-halfword (AH) instruction in the "PAYROLL" program at a relative offset of 4,926 (X'133E) bytes by logically or-ing the decimal value "1900" with the value stored in memory at a location 15,040 (X'3AC0) bytes from the start of the program. This example illustrates that corrective action is not restricted to subtraction-type instructions but can be defined for essentially any type of instruction.

In another embodiment represented by Table II, the control information indicates whether a particular corrective action is to be taken before or after a specified instruction is executed and also allows multiple steps of corrective action to be defined for a given instruction. The information in the fourth column includes plus and minus signs to indicate whether corrective action is to be taken before (−) or after (+) instruction execution.

TABLE II

| Program Name | Relative Offset | Type of Instruction | Corrective Action | Corrected Parameter | Corrective Value |
| --- | --- | --- | --- | --- | --- |
| PAYROLL | X'0E5C | SR | AR− | R7 | D'1000000 |
| PAYROLL | X'10A8 | SP | AP− | X'0808(R10) | X'100C |

TABLE II-continued

| Program Name | Relative Offset | Type of Instruction | Corrective Action | Corrected Parameter | Corrective Value |
|---|---|---|---|---|---|
| PAYROLL | X'10A8 | SP | AND+ | X'080C(R10) | X'0FFF |
| PAYROLL | X'133E | AH | OR+ | X'3AC0 | D'1900 |

The information in the first row of Table II indicates corrective action is taken before instruction execution.

The information in the second and third rows of Table II indicate that corrective action for the specified instruction comprises two steps; the first step is taken before instruction execution and the second step is taken after instruction execution. In the second step, two bytes of the value stored in memory is logically and-ed with the mask X'0FFF.

The information in the fourth row of Table II indicates corrective action is taken after instruction execution.

The corrective action defined in the fourth columns of Tables I and II is expressed in terms of instructions from the System/370 instruction set; however, the corrective action need not be limited to any particular set of instructions because essentially any form of corrective action can be taken at one or more points anywhere during instruction fetches, decode and execution. For example, only a specified portion of an operand or result could be modified or subjected to an additional operation.

In yet another embodiment, the control information in table 54 can define parameters and the entry point of a routine to provide the corrective action.

In a preferred embodiment, the operation code of selected instructions in a program for which corrective action is to be taken is "zapped" or replaced with a designated code that causes the instruction fetch, decode and execute process to invoke functions that provide the desired corrective action. For example, in System/370 type systems, X'00 is an undefined operation code that normally causes a "program exception" to be asserted if an attempt is made to execute such an instruction. In systems incorporating features of the present invention, however, such an operation code can be used to invoke the corrective features. If the program name and location of the zapped instruction corresponds to an entry in table 54, intercept 47 passes control to correct 48 for corrective action. If a corresponding entry is not found in table 54, intercept 47 passes control in normal fashion to execute 43 so that a program exception can be asserted.

A designated operation code that is defined but rarely encountered may also be used. For example, X'DF' is the operation code for an EDMK instruction that formats packed-decimal data into a character representation. The features providing corrective actions could be invoked by such an operation code in a manner similar to that described above. If the program name and location of an EDMK instruction corresponds to an entry in table 54, correct 48 would be allowed to take corrective action. If table 54 does not have a corresponding table entry, execute 43 would be allowed to execute the instruction normally.

By using such a technique, very little if any processing overhead is incurred for instructions where no corrective action is to be taken. If such a technique is not used, however, some overhead would be incurred for each instruction to check the contents of table 54 and determine if any corrective action is to be taken. The overhead is undesirable because it reduces the processing efficiency of the system.

Media

The present invention may be implemented by a computer program embodied on various machine readable media including magnetic media such as tape and disk, on optical media such as film or CD-ROM, and on electronic or electromagnetic media such as signals used to convey digital information via telecommunications lines, optical fiber channels, and RF propagation.

Electronic media may be used to advantage in systems where a computer system is configured to call another site for automatic distribution of machine readable material. For example, a set of microcode, macrocode, and/or object code routines needed to implement all or portions of test environment 2 or production environment 3 could be automatically distributed to a computer system in response to that computer system contacting a central support site.

What is claimed is:

1. A method for taking corrective in a computer system action during execution of a computer program, said method comprising:

receiving input and constructing control information in response thereto; and performing said execution of said computer program and, in response to said control information, intercepting said execution during processing of instruction fetch, instruction decode or instruction execution for selected instances of instructions in said computer program identified by said control information and modifying results achieved by executing said selected instances of instructions, wherein said results are modified according to said control information so as to take said corrective action.

2. A method according to claim 1 that further comprises performing a test-mode execution of said computer program, obtaining diagnostic information for designated instructions, and generating a report of said diagnostic information, wherein said input is prepared in response to said report and identifies said selected instances of instructions in said computer program.

3. A method according to claim 2 wherein said diagnostic information is obtained by monitoring at least one of instruction fetch, instruction decode, instruction execution and registers.

4. A method according to claim 1 wherein said results are modified at the end of instruction execution.

5. A method according to claim 1 wherein said results are modified by modifying values of one or more computer program instruction operands prior to instruction execution.

6. A method according to claim 1 wherein said input alters said computer program so as to effect intercepting said execution.

7. A method according to claim 1 wherein said results are modified according to information stored in random access computer memory inaccessible by instructions in said computer program but accessible by instructions in another computer program executing in said computer system.

8. A system for taking corrective action during execution of a computer program, said system comprising:

random access memory storing control information; and a processor coupled to said random access memory and having components that process instruction fetch, instruction decode and instruction execution of instructions in said computer program and, in response to said control information, intercept the processing of instruction fetch, instruction decode or instruction execution for selected instances of instructions in said computer program identified by said control information, and modify results achieved by executing said selected instances of instructions, wherein said results are modified according to said control information so as to take said corrective action.

9. A system according to claim 8 that also performs a test-mode execution of said computer program, obtains diagnostic information for designated instructions, generates a report of said diagnostic information, and receives input that is prepared in response to said report and identifies said selected instances of instructions in said computer program.

10. A system according to claim 9 wherein said diagnostic information is obtained by monitoring at least one of instruction fetch, instruction decode, instruction execution and registers.

11. A system according to claim 8 wherein said results are modified after processing instruction execution.

12. A system according to claim 8 wherein said results are modified by modifying values of one or more computer program instruction operands prior to processing instruction execution.

13. A system according to claim 8 that also receives input that identifies said selected instances of instructions in said computer program and, in response, alters said computer program so as to effect the intercept of said processing.

14. A system according to claim 8 wherein said results are modified according to information stored in memory that is inaccessible by instructions in said computer program but accessible by instructions in another computer program executing in said system.

15. A medium readable by a machine, embodying a program of microcode or macrocode instructions for said machine to perform a method for taking corrective action during execution of a computer program, said method comprising:

receiving control information; and intercepting processing of instruction fetch, instruction decode or instruction execution for selected instances of instructions in said computer program identified by said control information and modifying results achieved by executing said selected instances of instructions, wherein said results are modified according to said control information so as to take said corrective action.

16. A medium according to claim 15 wherein said method further comprises obtaining diagnostic information for designated instructions during a test-mode execution of said computer program, wherein a report is generated from said diagnostic information, and input is prepared in response to said report that identifies said selected instances of instructions in said computer program.

17. A medium according to claim 16 wherein said diagnostic information is obtained by monitoring at least one of instruction fetch, instruction decode, instruction execution and registers.

18. A medium according to claim 15 wherein said results are modified at the end of processing instruction execution.

19. A medium according to claim 15 wherein said results are modified by modifying values of one or more computer program instruction operands prior to processing instruction execution.

20. A medium according to claim 15 wherein said results are modified according to information stored in computer memory inaccessible by instructions in said computer program but accessible by instructions in another computer program executing in said machine.

* * * * *